United States Patent [19]
Erickson

[11] Patent Number: 6,062,570
[45] Date of Patent: *May 16, 2000

[54] STEM SEALING SYSTEM FOR BROAD TEMPERATURE RANGES

[75] Inventor: Irving C. Erickson, Rockford, Ill.

[73] Assignee: Barber-Colman, Loves Park, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/620,695

[22] Filed: Mar. 21, 1996

Related U.S. Application Data

[60] Provisional application No. 60/011,821, Feb. 16, 1996.

[51] Int. Cl.$^7$ ............................................. F16J 15/06
[52] U.S. Cl. ................... 277/529; 277/516; 277/522; 277/531; 277/532; 277/540
[58] Field of Search ................ 277/72 FM, 105, 277/106, 112, 117, 123, 124, 125, 135, 510, 512, 516, 522, 529, 531, 532, 534, 540

[56] References Cited

U.S. PATENT DOCUMENTS

| | | | |
|---|---|---|---|
| 875,363 | 12/1907 | Martin | 277/105 |
| 1,211,205 | 1/1917 | MacDonald | 277/105 |
| 2,139,218 | 12/1938 | Asai | 277/112 |
| 2,400,091 | 5/1946 | Alfthan | 18/47.5 |
| 2,400,099 | 5/1946 | Brubaker et al. | 18/55 |
| 2,578,523 | 12/1951 | Llewellyn | 18/55 |
| 2,711,333 | 6/1955 | Rodgers | 277/124 |
| 2,765,185 | 10/1956 | Mott | 277/124 |
| 3,048,412 | 8/1962 | Baker | 277/124 |
| 3,183,007 | 5/1965 | Tann | 277/72 FM |
| 4,165,085 | 8/1979 | Persson | 277/228 |
| 4,296,806 | 10/1981 | Taylor et al. | 166/120 |
| 4,306,728 | 12/1981 | Huperz et al. | 277/125 |
| 4,364,542 | 12/1982 | Meyer | 277/124 |
| 4,406,469 | 9/1983 | Allison | 277/123 |
| 4,451,047 | 5/1984 | Herd et al. | 277/26 |
| 4,558,874 | 12/1985 | Williams et al. | 277/112 |
| 4,577,872 | 3/1986 | Bake et al. | 277/12 |
| 4,826,181 | 5/1989 | Howard | 277/112 |
| 4,844,411 | 7/1989 | Nelson | 277/125 |
| 4,886,241 | 12/1989 | Davis et al. | 277/105 |
| 4,898,393 | 2/1990 | Rollins | 277/27 |
| 5,062,439 | 11/1991 | Butler et al. | 277/72 FM |
| 5,493,951 | 2/1996 | Harrison | 92/155 |
| 5,538,080 | 7/1996 | Bassinger | 166/84.2 |

OTHER PUBLICATIONS

Aikin, J.A., "Valve Packing and Live–Loading Improvements", *Valve Magazine*, Summer 1992, pp. 21–26.

*Primary Examiner*—Daniel G. DePumpo
*Attorney, Agent, or Firm*—Terrence Martin; Sean Detweiler; Jules Morris

[57] ABSTRACT

A stem seal having first and second wiping members circumjacent a stem is disposed within a bore. A lubricant-bearing ring is disposed about the stem within the bore between the wiping members, under compression therefrom. Projections from the wiping members intrude into the lubrication ring so as to depress the central surface areas thereof. Similar projections are used to center a coil spring against one of these seal members and against an additional seal member. By forming the lubricant ring of open-cell loam or mesh construction, superior lubricant bearing capacities may be achieved.

34 Claims, 4 Drawing Sheets

STEM SEALING SYSTEM FOR BROAD TEMPERATURE RANGES

TECHNICAL FIELD

This application claims the benefit of U.S. Provisional application Ser. No. 60/011,821 filed Feb. 16, 1996.

The present invention relates to valve stems and particularly to sealing arrangements for both high and low temperature valve stems with reduced friction. More particularly, the present invention relates to valve stem packing seal systems bearing a lubricant source for use over broad and varying temperatures.

BACKGROUND OF THE INVENTION

A valve stem seal's fitness for use depends upon its ability to prevent fluid from passing thereby, upon its mechanical strength, and upon its antifriction properties. The adverse effects of temperature upon the valve components and frictional properties significantly affect fitness for use.

In a sealing system for the purpose of isolating fluid on one side of a seal from fluid on the other while directly transmitting mechanical force and/or torque from one side to the other, one or more seals wipe the moving member in a manner directed to isolating the fluids. This is conventionally done with mechanical wipers such as "Vee's, cones, or U-cups" with initial lubrication provided. Lubrication methods include having a compressible section of felt or braid which serves as a seal and wick for lubricant when squeezed by a packing cap or spring.

With most stem seal systems, shrinkage and lack of compliance of said materials at low temperatures result in leaks. Special materials are required at high temperatures, wherein the shrinkable/compliance problems are exacerbated at low temperatures.

Plastic materials have substantially higher yield strengths and low creep rates at lower temperatures, and hence the adaptability which contributes to sealing at higher temperatures is not readily available at lower temperatures.

The purposes of the present invention are to provide a low friction valve stem sealing arrangement in which a lubrication ring carries lubricant to the seal elements, and to provide positive lubricant installation and containment.

SUMMARY OF THE INVENTION

An improved stem sealing system for broad temperature ranges is assembled from a bonnet which may be cylindrical and has a longitudinal axis. An axial bore having a surface extends through the bonnet. The bonnet is partially closed at a bottom end thereof by a radially inward extending lip. It is closed at the top, opposite end of the cylindrical bonnet by a packing top cover threaded into a recessed portion of the bonnet. A moveable stem extends along the central axis through the bonnet. The stem is terminated at a valve plug assembly at the bottom end outside the bonnet, and may be connected to an operative element at the top end of the stem. A fixed stem seal element rests inside the bonnet cylinder against a bottom lip supporting a compressible loading spring the top end of which rests against a lower wiping member and urges it away from the bottom lip. An upper wiping member is secured within the cylinder central bore by a packing top cover.

The present invention has seal member wiping surfaces which are urged into sealing engagement by the loading spring, and are then lubricated differently than in the prior art. One or more spaces between two seal member edges contains an intermediate substance consisting of approximately 50% grease inside a spongy foam-like material with open cells, forming a lubrication ring. The space(s) is compressed by the loading spring, and the assembly is closed at the bottom and top, where it is compressed by a packing top.

Between the upper and lower wiping members lies the lubrication ring. The upper and lower wiping members, the lubrication ring, and the fixed stem seal lie in frictional engagement with an inner diameter surface forming the central bore of the bonnet. Further, the upper and lower wiping members, the lubrication ring, and the fixed stem seal are in frictional contact with, and circumjacent the valve stem. The upper and lower wiping members include axially extended central portions and each includes an axially recessed area facing and engaging the upper and lower wiping member axially extended portions extending into the lubrication ring. That is, the axial extensions of the upper and/or lower wiping members closely mate with and may form the lubrication ring recesses. One or more intermediate wiping members may be included, accompanied by additional lubrication rings in the order: wiping member, lubrication ring, wiping member, etc.

The axially extended central portions of the stem seal and lower wiping member assist in centering the loading spring which lies therebetween. The lubrication ring(s) thus takes the form of a toroid with an axially extending outer rim portion and central depressed areas on both sides thereof.

Each of the lubrication rings is formed of a grease or lubricant retaining foam material or the like, preferably of an open cell structure material.

To overcome shrinkage and lack of compliance at low temperatures, the open cell sponge-like configuration is utilized to substantially increase adaptability at all temperatures, providing low temperature flexibility and a capability for holding lubricants without the use of specialty or braided materials. These characteristics enable design of effective packings which are effective over wider temperature spans and excursions. The length of the pressure chamber(s) is not limited and can exceed stem travel, so that scratches caused by fluid particle entrapment will not traverse both outside sealing edges.

Compression of the lubrication ring(s) by the upper and lower wiping members provides three functions. First, the axially extending central portions of the upper and lower wiping members are fitted to the lubrication ring such that compression of the lubrication ring between these wiping members forces lubricant from the lubrication ring. Secondly, these compressive forces tend to expand the outer periphery of the lubrication ring, as well as the wiping members, against the inner wall of the central bonnet. Thirdly, compressive forces urge the lubrication ring to expand inwardly against the valve stem, thus sealing the valve stem directly. The outer compressive forces of the lubrication ring provide a seal against microscopic leakage paths along the inner wall of the central bore of the cylindrical bonnet, and also provide a movable seal against microscopic leakage paths along the valve stem in this sealing assembly.

In preparation for assembly of the stem seal, the lubrication ring(s) may be prefilled with lubricant. The lubricant may also be installed between the wiper members and the lubrication ring(s) during assembly. With a valve stem fixed stem seal, loading spring, and lower wiping member in place, the lubrication ring and lubricant are installed into the bonnet capturing the lubricant within the cavity.

Alternatively, lubricant may be injected before the lube rings, after the lube rings, or both depending on whether it is built upside down or not. The upper wiping member is then installed. The wiper members, with their projections facing the foam lubrication ring, are forced together against the lubrication ring by tightening the packing top and the projections force themselves into the foam lubrication ring. This provides localized compressive stresses to grip the stem and expand outwardly against the axial bore surface. Simultaneously, the lubricant (having no escape path) is forced into, fills, and flows through the open cell structure of the lubrication ring, thereafter reaching and lubricating the stem and sealing any microscopic leak paths. Any remaining lubricant is retained within the cavity beyond the open cell capacity of the lubrication ring.

The pressure within this lubrication ring-filled space is the pressure of the fluid on the spring side combined with the pressure from the spring force, divided by the cross sectional area of the bore. Thus, when designed with the spring on the high pressure side, the chamber pressure is greater than the fluid presser P and flow tendencies are from the chamber toward the fluids, rather than into it or through it. The lubricant effectively cannot flow between the stem and the seal members which are in intimate contact therewith and separated only by an adhering film of lubricant which clings to the stem filling the space between surface aspiraties.

In the event of wear, or loss of lubricant, the spring provides a pressure force and movement replacing the lubricant used from the cavity and the spongy material assists in squeezing the sealing edges to wipe the stem clean. Reciprocating stem action to move the seals back and forth a very small amount brings new lubricant to the stem.

BRIEF DESCRIPTION OF THE DRAWING FIGURES

The invention will appear more clearly from a detailed description of the preferred embodiments of the invention to be given in the following description taken together with the accompanying drawings in which.

DETAILED DESCRIPTION OF THE PREFERRED EMBODIMENTS

Figure 1:
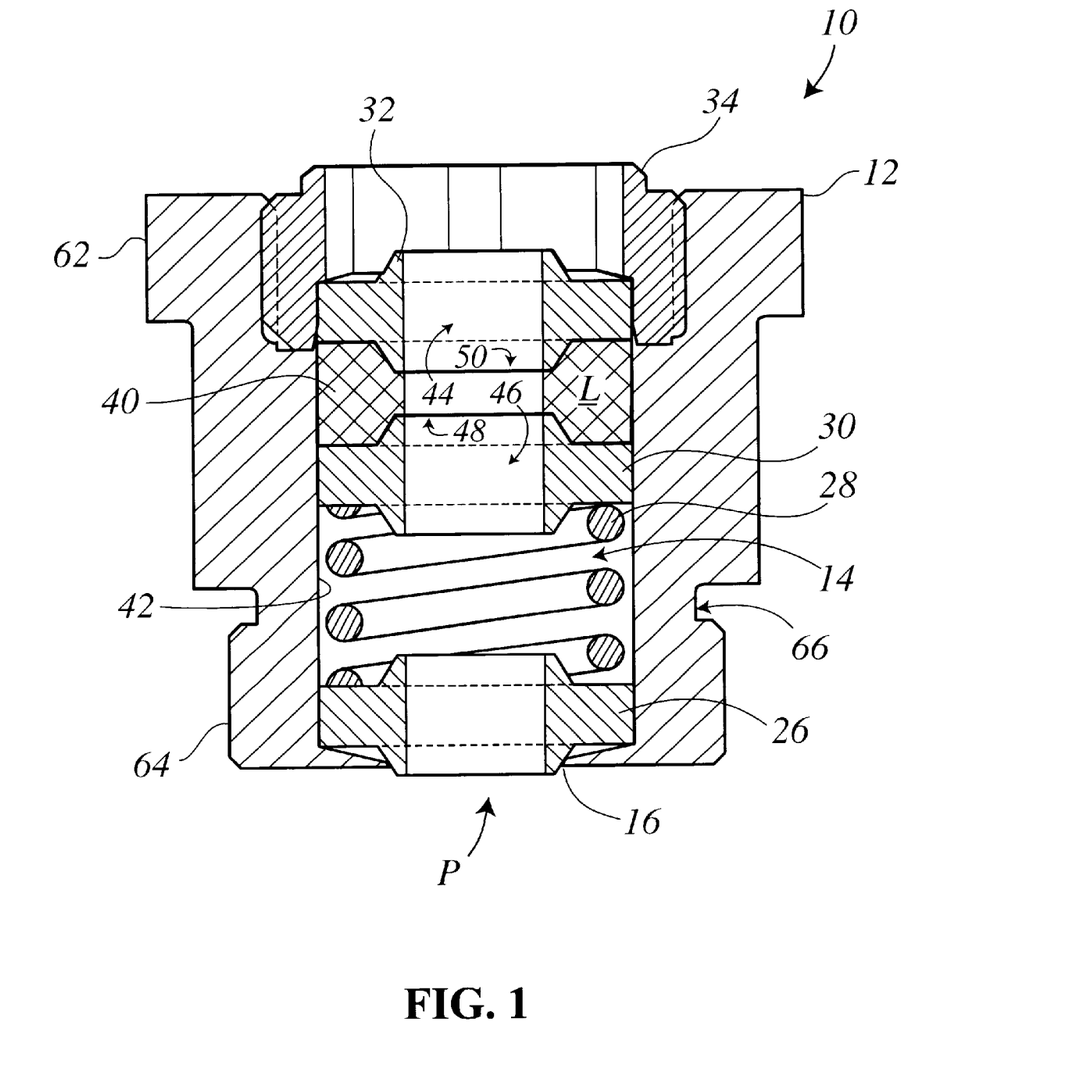
FIG. 1 is a cross-section of the stem sealing system.
Figure 2:
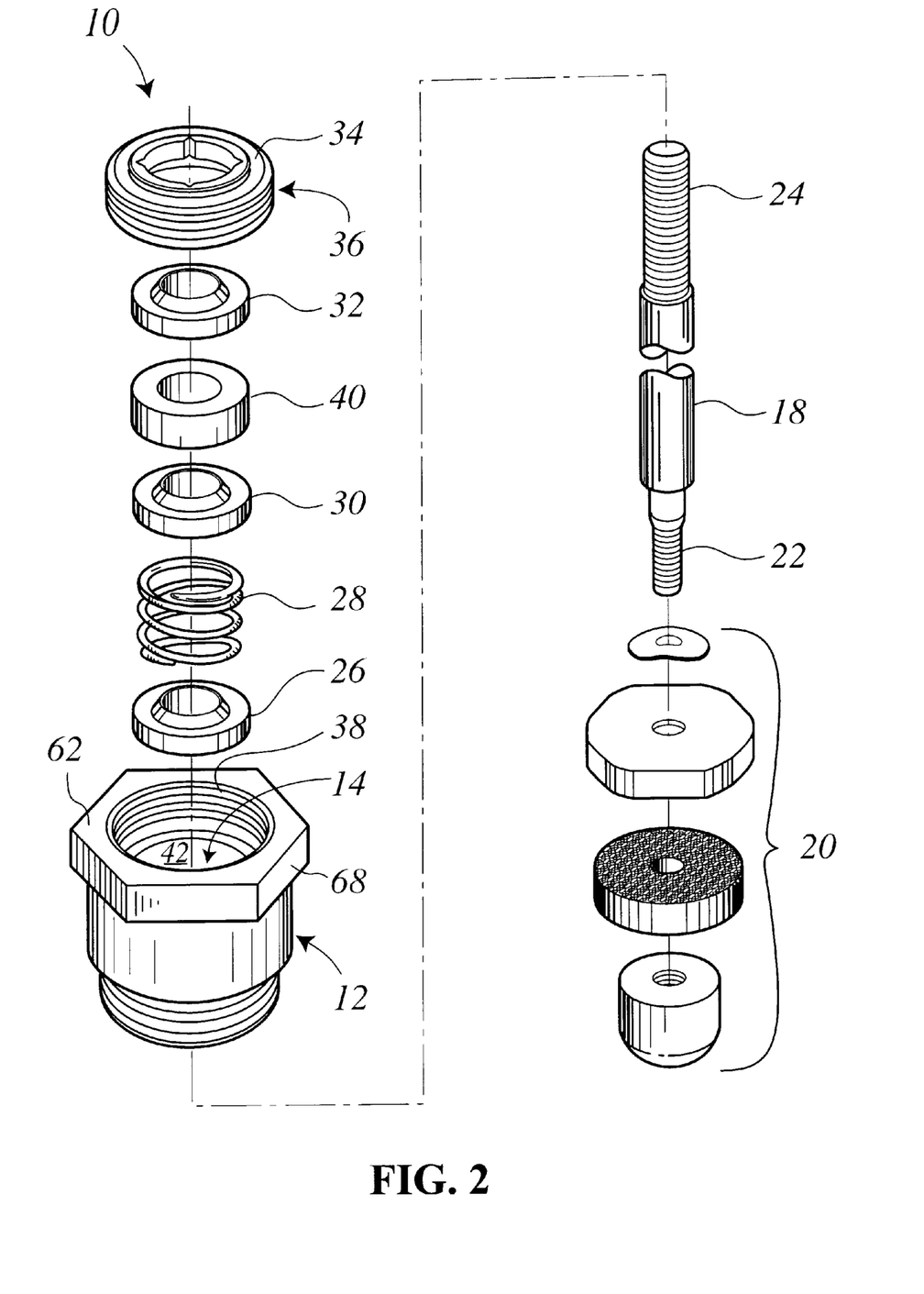
FIG. 2 illustrates an exploded view of the stem sealing system assembly.
Figure 3:
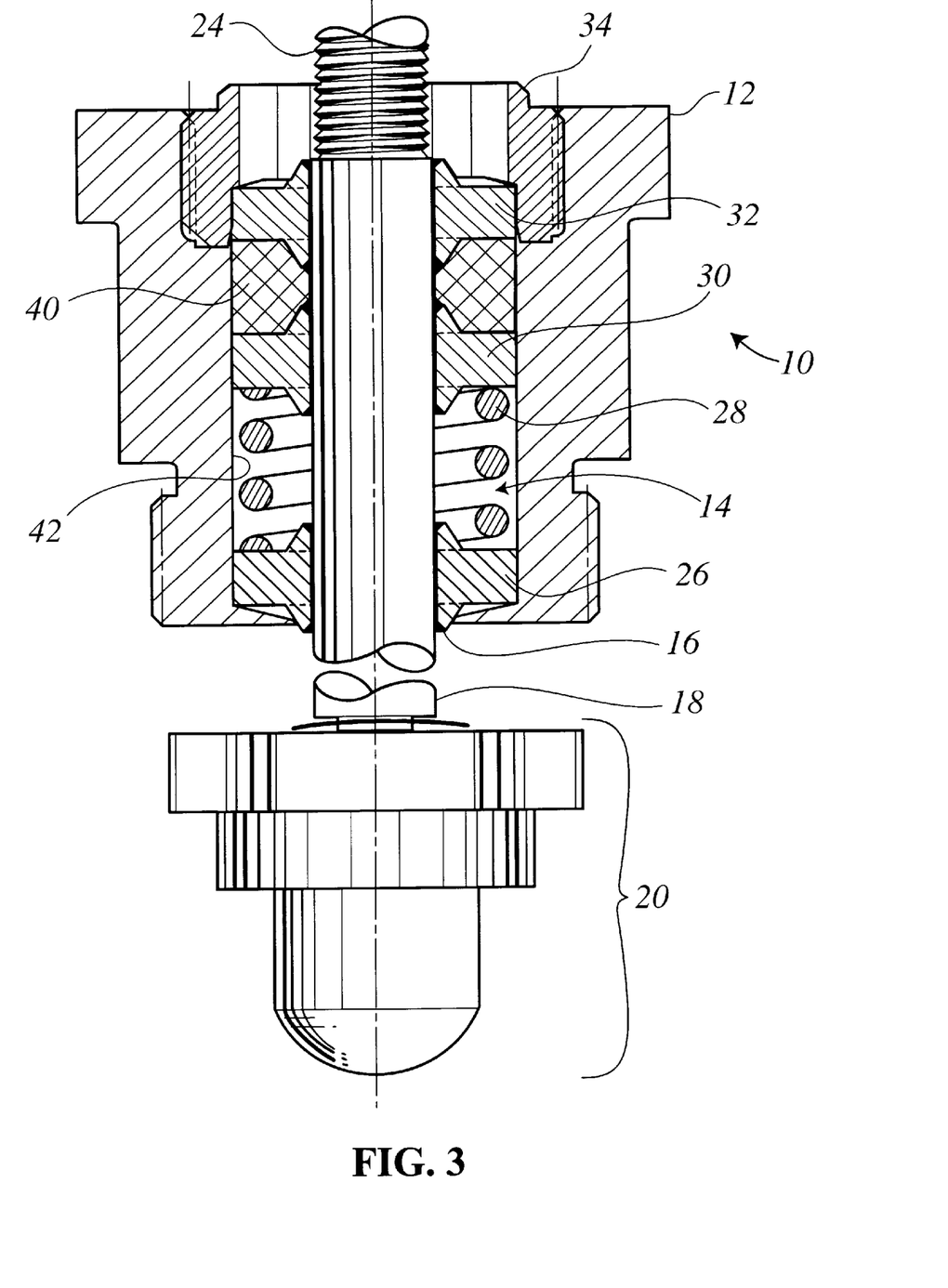
FIG. 3 is a cross-section of the stem sealing system of FIG. 1, further including the valve stem and plug assembly.

Referring now to the drawing figures, wherein the illustrations are for purposes of showing preferred embodiments of the invention 10 only and not for purposes of limiting the appended claims, there is shown in FIGS. 1–3 a bonnet 12, which may be cylindrical and which may have stepped portions along its outer periphery includes a central bore 14. The central bore is partially enclosed at the bottom by a lip 16 which extends radially inward of the bore 14.

A valve stem 18 (see FIGS. 2 and 3) is disposed within the central bore 14 of bonnet 12 and extends along the central axis through the bonnet. The valve plug assembly 20 is attached at the bottom end of stem 18 by threads 22 or the equivalent. Threads 24 (or the equivalent) are included at the top end of the valve stem 18 for connection to an operator.

A fixed stem seal element 26 rests inside the bonnet bore 14 against the bottom lip 16. Seal 26 supports a compressible loading spring 28, which may be helical in form, and the top end of the spring 28 rests against a lower wiping member 30. The loading spring 28 urges lower wiping member 30 apart from the bottom lip 16. An upper wiping member 32 is secured within this central bore 14 of the bonnet 12 by a packing top cover 34. Top cover 34, which may include external threads 36 mating with internal threads 38 located within a recessed top portion of the bore 14 of bonnet 12, secures the upper wiping member 32 and the remaining valve seal elements within the bonnet.

A lubrication ring lies between the upper and lower wiping members. The lower and upper wiping elements 30, 32, the lubrication ring 40, and the fixed end seal 26 lie in frictional engagement with the inner surface 40 of the central bore in the bonnet. The lower and upper wiping members 30, 32, the lubrication ring 42, and the fixed end seal 26 are also in frictional contact with and circumjacent to, the valve stem 18 (see FIG. 3).

Figure 4:
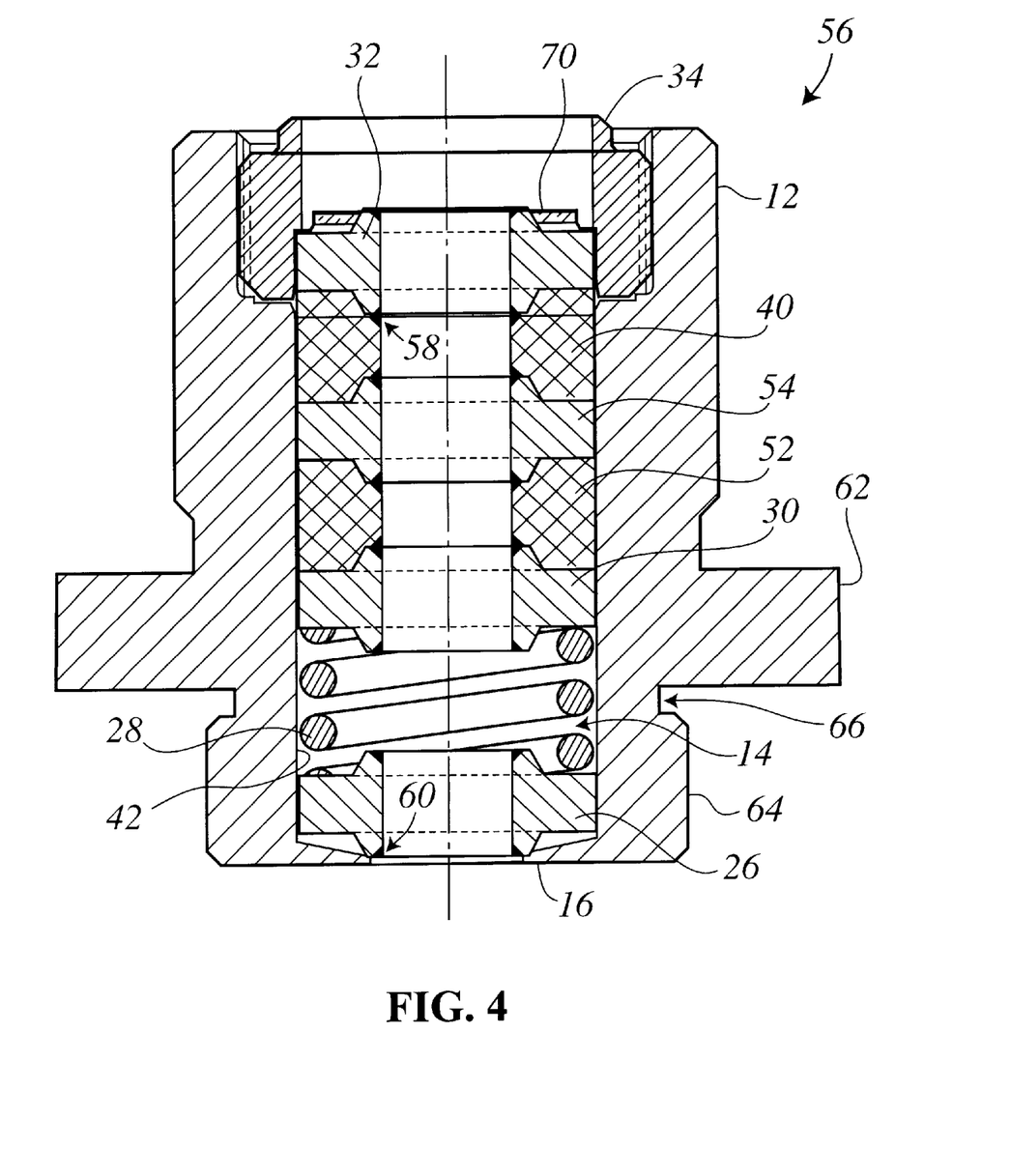
FIG. 4 is a cross-section of an alternate stem sealing system including an intermediate wiping member and an additional lubrication ring.

The upper and lower wiping members include axially extended central portions 44, 46. The lubrication ring 40 may be formed in a simple hollow cylindrical shape as shown in FIG. 2. The lubrication ring may also be preformed to include axially recessed central areas 48, 50 facing and engaging the lower and upper wiping members 30, 32 axially extended portions 44, 46. These axially extended portions 44, 46 depress and conform the central areas 48, 50 (respectively) on respective lower and upper transverse surfaces of lubrication ring 40 when placed under axial compression by spring 18. The lubrication ring then takes the form of a toroid with an axially extended outer rim portion and central depressed areas on each side thereof. As can be seen in FIGS. 3 and 4, the radially centrally located depressed area of lubrication ring 40 may include a surface perpendicular to the axis of the lubrication ring (which coincides with the axis of the stem after assembly), and the radially outwardly located area of the lubrication ring may likewise include a surface perpendicular to the axis. Since the overall shape of the lubrication ring is toroidal, the transition between these two surface areas can be a sloping surface, shaped as a truncated cone. In a similar manner, the radially centrally located extended area of a wiping member may include a surface perpendicular to the axis of the wiping member, and the radially outwardly located area of the wiping member may likewise include a surface perpendicular to the axis. The transition between these two surface areas can be a sloping surface, shaped as a truncated cone. The wiping members 30, 32 as well as fixed end seal 26 are formed of a material which preferably retains its size, shape, and compliance at low temperatures, as well as resists severe deformation at high temperatures.

For purposes of this example, the valve stem 18 may be of about ¼-inch (6 mm) diameter and of a length suitable to extend from the valve plug assembly 20 to the operator, not shown. The lower and upper wiping members 30, 32 may be of solid virgin polytetrafluoroethylene ("Teflon"™) or the equivalent. Likewise, fixed end seal 26 may also be of virgin Teflon or may be reinforced or formed of another material for added strength. Lubrication ring 40 is of an open-celled Teflon foam or the like to provide a reservoir of lubricant for long term sealing and lubrication L at extended temperatures.

As shown more clearly in FIG. 4, one or more additional lubrication rings 52 and one or more intermediate wiping members 54 may be disposed along the stem 18 shaft (not seen in FIG. 4) within the bore 14 of bonnet 12 to form a higher-pressure stem sealing system 56 in an alternate embodiment of the present invention.

An important feature of the present device resides in the ultimately toroidal shape of the porous Teflon lubrication ring 40 (and 52, etc.) in cooperation with the lower and upper wiping members 30, 32 (and the immediate wiping members 54, etc.). The lubrication rings integrate with the upper and lower wiper members such that movement of the shaft 18 and activation of the loading spring 28 results in a positive displacement of lubricant from the lubricant ring 40 (52). The lower and upper wiping members 30, 32 (54) and the lubrication ring 40 (52) are forced together by tightening the packing top 34 via the force of loading spring 28. The axially extending portions of the wiping members 30, 32 (54) force themselves into the softer lubrication ring 40 (52) providing localized compressive stress forces to grip the stem 18 and the inner wall 42 of the bonnet at the central core thereof. More particularly, greater sealing forces are urged against the stem at a plurality of seal member, lubrication ring, and stem locations, as illustrated by points 58, 60 in FIG. 4. Through the urging force of loading spring 28 the lubrication L is forced into and flows through these open cells of the lubrication ring 40 (52) reaching and lubricating valve stem 18 and the bore 14 inner surface 42, thus sealing any microscopic leakage paths through the valve stem assembly and bonnet.

Note that fixed stem seal 26 initially seals the stem seal assembly from the valve fluid P and thus partially isolates the remaining seal components therefrom. Further, fixed end seal 26 provides a seat for loading spring 28. Through the use of axially extending central portions surrounding the central bore in fixed end seal 26, the fixed end seal can self-position itself for sealing against bottom lip 16 (as shown in FIG. 1) and also provides the self-centering mechanism to pre-position the loading spring 28. Depending on the size and shape selected for seal 26 and the inner diameter and shape of lip 16, the self-positioning feature may be eliminated, as shown in FIG. 4.

Further, a seal washer 70 having a larger central aperture (shown only in FIG. 4) may be used between packing top cover 34 and the upper peripheral surface of upper wiping member 32 in order to distribute the sealing forces supplied by the packing top cover more uniformly against wiping member.

The bonnet 12, which is preferably circular, may be of a stepped design including radially extending 62, 64 and radially recessed 66 portions distributed along its length to provide an outer flange for sealing. Inner recessed peripheral grooves 66 may be provided for holding O-rings or the like for sealing. Portions may be threaded to enable mounting in the valve body, not shown. Suitable "flats" 68 may be provided on the bonnet to facilitate application of the rotary torque by a wrench to tighten the bonnet in the valve body.

Assembly of the stem seal 10 (56) may be accomplished using 40 (52) lubrication ring(s) which are prefilled with lubricant L (see FIGS. 1, 2, and 4). The lubricant L may also be installed between the wiper members 30, 32 (and 54) and the lubrication ring(s) during assembly. With a valve stem 18, fixed stem seal 26, loading spring 28, and lower wiping member 30 in place, the lubrication ring 40 and lubricant L are installed into the bonnet 12 capturing the lubricant L circumjacent stem 18 within the cavity 14. Alternatively, lubricant L may be injected into the cavity 14 before the lube ring(s) 40 (52), after the lube ring(s), or both depending on whether it is assembled upside down or not. The upper wiping member 32 is then installed. The wiper members 30, 32 (54) with their projections facing the foam lubrication ring(s) 40 (52), are forced together against the lubrication ring(s) by tightening the packing top 34 and the projections then force themselves into the foam lubrication ring(s). This method provides localized compressive stresses to grip the stem and expand outwardly against the axial bore surface at various locations: for example 58, 60 (FIG. 4). Simultaneously, the lubricant L (having no escape path) is forced into, fills, and flows through the open cell structure of the lubrication ring(s) 40 (52), thereafter reaching and lubricating the stem 18 and sealing any microscopic leakage paths. Any remaining lubricant L is retained within the cavity beyond the open cell capacity of the lubrication ring.

Although certain presently preferred embodiments of the invention have been described herein, it will be apparent to those skilled in the art to which the invention pertains that variations and modification of the described embodiment may be made without departing from the spirit scope of the invention. Accordingly, it is intended that the invention be limited only to the extent required by the appended claims and the applicable rules of law.

We claim:

1. A stem and bore sealing system comprising first and second wiping members disposed circumjacent an elongated portion of a stem and disposed within a bore, a lubrication ring disposed circumjacent the stem, within the bore, and intermediate the first and second wiping members, wherein the lubrication ring comprises a porous, lubricant-retaining structure under axial compression between the first and second wiping members and wherein the lubrication ring has respective lubricant exuding surfaces which are disposed in contact with the stem, the bore, and the first and second wiping members;

wherein the lubrication ring is toroidal in shape, having on at least one side a radially centrally located, axially depressed area and a radially outwardly located area having a larger axial dimension than the axially depressed area; and wherein at least one of the radially centrally located area and the radially outwardly located area includes a surface substantially perpendicular to an axis of the stem.

2. The sealing system of claim 1, wherein the lubrication ring includes a transition area having a surface with the shape of a truncated cone and extending between the radially centrally located area and the radially outwardly located area.

3. The sealing system of claim 2, wherein the upper wiping member is ring shaped, having a radially centrally located, axially extending central area on at least one side thereof mating with the radially centrally located, axially depressed central area of the lubrication ring.

4. The sealing system of claim 2, wherein the lower wiping member is ring shaped, having a radially centrally located, axially extending central area on at least one side thereof mating with the radially centrally located, axially depressed central area of the lubrication ring.

5. The sealing system of claim 1, wherein the lubrication ring is ring-shaped with a central bore.

6. The sealing system of claim 1, wherein the lower wiping member is polytetrafluoroethylene.

7. A high/low-temperature valve stem sealing system, comprising:

a bonnet having a central axis therein about a cylindrical bore, said bonnet having distal and proximal ends, wherein said distal end is partially closed by a radially inward extending bottom lip;

a removable top cover having a central aperture and adapted for at least partially enclosing said proximal end of the bonnet;

a fixed stem seal member disposed in the bore adjacent the bottom lip;

a first wiping member disposed in the bore adjacent to and retained therein by the top cover;

a second wiping member disposed in the bore and axially displaced from the first wiping member;

a lubrication ring disposed in the bore between the first and second wiping members, said lubrication ring disposed in contact with a stem and the bore; and a loading spring member disposed between the bottom lip and the second wiping member, adapted for urging the second wiping member toward the lubrication ring;

wherein the lubrication ring is toroidal in shape, having on at least one side a radially centrally located, axially depressed area from axial compression thereof by at least one of the first and second wiping members and a radially outwardly located area having a larger axial dimension than the axially depressed area; and wherein at least one of the radially centrally located area and the radially outwardly located area has a surface substantially perpendicular to an axis of the stem.

8. The sealing system of claim 7, wherein the lubrication ring comprises a porous, lubricant-retaining material.

9. The sealing system of claim 7, wherein the lubrication ring is polytetrafluoroethylene.

10. The sealing system of claim 7, wherein the lubrication ring includes a transition area having a surface with the shape of a truncated cone and extending between the radially centrally located area and the radially outwardly located area.

11. The sealing system of claim 10, wherein the upper wiping member is ring shaped, having a radially centrally located, axially extending central area on at least one side thereof mating with the radially centrally located, axially depressed central area of the lubrication member.

12. The sealing system of claim 10, wherein the lower wiping member is ring shaped, having a radially centrally located, axially extending central area on at least one side thereof mating with the radially centrally located, axially depressed central area of the lubrication member.

13. The sealing system of claim 7, wherein the lubrication ring is ring-shaped with a central bore.

14. The sealing system of claim 7, wherein the lubrication ring is toroidal in shape, having an axially extended peripheral area on at least one side thereof.

15. The sealing system of claim 7, wherein the upper wiping member is polytetrafluoroethylene.

16. The sealing system of claim 7, wherein the lower wiping member is polytetrafluoroethylene.

17. The sealing system of claim 7, wherein the fixed stem seal member is polytetrafluoroethylene.

18. The sealing system of claim 7, wherein the upper wiping member is ring shaped, having a radially centrally located, axially extending central area on at least one side thereof.

19. The sealing system of claim 7, wherein the lower wiping member is ring shaped, having a radially centrally located, axially extending central area on at least one side thereof.

20. The sealing system of claim 7, wherein the fixed stem seal member is ring shaped, having a radially centrally located, axially extending central area on at least one side thereof.

21. The sealing system of claim 7, wherein the fixed stem seal member is ring shaped, having a radially centrally located, axially extending central area on at least one side thereof, the loading spring includes a central bore, and the axially extending central area of the fixed stem seal member centrally positions the spring within the bonnet bore.

22. The sealing system of claim 7, wherein the lower wiping member is ring shaped, having a radially centrally located, axially extending central area on at least one side thereof, the loading spring includes a central bore, and the axially extending central area of the lower wiping member centrally positions the spring within the bonnet bore.

23. A method for assembling a high/low-temperature valve stem sealing system, comprising the steps of:

a) providing a bonnet having a central axis therein about a cylindrical bore, said bonnet having distal and proximal ends, wherein said distal end is partially closed by a radially inward extending bottom lip;

b) providing a valve stem along the central axis in the bore;

c) installing a fixed stem seal member in the bore circumjacent the stem and adjacent the bottom lip;

d) installing a loading spring member within the bore circumjacent the stem and against the fixed stem seal;

e) installing a first wiping member in the bore circumjacent the stem and against the spring member;

f) installing a lubrication ring in the bore circumjacent the stem, against the first wiping member, and in contact with the stem and the bore;

g) installing a second wiping member against the lubrication ring in the bore circumjacent the stem and axially displaced from the first wiping member;

h) compressing the spring member between the fixed steam seal member and wiping member, via the lubrication ring and the second wiping member with a removable top cover having a central aperture circumjacent the stem and adapted for at least partially enclosing said proximal end of the bonnet; and i) securing the fixed stem seal, the spring member, the first wiping member, the lubrication ring, and the second wiping member in the central bore with the removable top cover, whereby the lubrication ring is toroidal in shape, having on at least one side a radially centrally located, axially depressed area and a radially outwardly located area having a larger axial dimension than the radially centrally located area: and whereby at least one of the radially centrally located area and the radially outwardly located area has a surface substantially perpendicular to an axis of the stem.

24. The method of claim 23, wherein the lubrication ring is a porous material, further including the step of disposing a lubricant between the first wiping member and the lubrication ring.

25. The method of claim 23, wherein the lubrication ring is a porous material, further including the step of disposing a lubricant between the second wiping member and the lubrication ring.

26. The method of claim 23, wherein the lubrication ring is a porous material, further including the step of filling the lubrication ring with a lubricant before installation in step f).

27. A high/low-temperature valve stem sealing system, comprising:

a bonnet having a central axis therein about a cylindrical bore, said bonnet having distal and proximal ends, wherein said distal end is partially closed by a radially inward extending bottom lip;

a removable top cover having a central aperture and adapted for at least partially enclosing said proximal end of the bonnet;

a fixed stem seal member disposed in the bore adjacent the bottom lip;

a first wiping member disposed in the bore adjacent to and retained therein by the top cover;

a second wiping member disposed in the bore and axially displaced from the first wiping member;

a lubrication ring disposed in the bore between the first and second wiping members; and a loading spring member disposed between the bottom lip and the second wiping member, adapted for urging the second wiping member toward the lubrication ring;

wherein the lubrication ring comprises a porous lubricant-retaining materials wherein at least one of the first and second wiping members has on at least one side a radially centrally located axially extended area and a radially outwardly located area having a smaller axial dimension than the axially extended area: and wherein at least one of the radially centrally located area and the radially outwardly located area has a surface substantially perpendicular to an axis of the stem.

28. The sealing system of claim 27, wherein the at least one of the first and second wiping members includes a transition area having a surface with the shape of a truncated cone and extending between the radially centrally located area and the radially outwardly located area.

29. A high/low-temperature valve stem sealing system, comprising:

a bonnet having a central axis therein about a cylindrical bore, said bonnet having distal and proximal ends, wherein said distal end is partially closed by a radially inward extending bottom lip;

a removable top cover having a central aperture and adapted for at least partially enclosing said proximal end of the bonnet;

a fixed stem seal member disposed in the bore adjacent the bottom lip;

a first wiping member disposed in the bore adjacent to and retained therein by the top cover;

a second wiping member disposed in the bore and axially displaced from the first wiping member;

a lubrication ring disposed in the bore between the first and second wiping members; and a loading spring member disposed between the bottom lip and the second wiping member, adapted for urging the second wiping member toward the lubrication ring; [and]

wherein the first wiping member is polytetrafluoroethylene;

wherein at least one of the first and second wiping members has on at least one side a radially centrally located, axially extended area and a radially outwardly located area having a smaller axial dimension than the axially extended area; and wherein at least one of the radially centrally located area and the radially outwardly located area has a surface substantially perpendicular to an axis of the stem.

30. A high/low-temperature valve stem sealing system, comprising:

a bonnet having a central axis therein about a cylindrical bore, said bonnet having distal and proximal ends, wherein said distal end is partially closed by a radially inward extending bottom lip;

a removable top cover having a central aperture and adapted for at least partially enclosing said proximal end of the bonnet;

a fixed stem seal member disposed in the bore adjacent the bottom lip;

a first wiping member disposed in the bore adjacent to and retained therein by the top cover;

a second wiping member disposed in the bore and axially displaced from the first wiping member;

a lubrication ring disposed in the bore between the first and second wiping members; and a loading spring member disposed between the bottom lip and the second wiping member, adapted for urging the second wiping member toward the lubrication ring;

wherein the second wiping member is polytetrafluoroethylene;

wherein at least one of the first and second wiping members has on at least one side a radially centrally located, axially extended area and a radially outwardly located area having a smaller axial dimension than the axially extended area; and wherein at least one of the radially centrally located area and the radially outwardly located area has a surface substantially perpendicular to an axis of the stem.

31. A high/low-temperature valve stem sealing system, comprising:

a bonnet having a central axis therein about a cylindrical bore, said bonnet having distal and proximal ends, wherein said distal end is partially closed by a radially inward extending bottom lip;

a removable top cover having a central aperture and adapted for at least partially enclosing said proximal end of the bonnet;

a fixed stem seal member disposed in the bore adjacent the bottom lip;

a first wiping member disposed in the bore adjacent to and retained therein by the top cover;

a second wiping member disposed in the bore and axially displaced from the first wiping member;

a lubrication ring disposed in the bore between the first and second wiping members; and a loading spring member disposed between the bottom lip and the second wiping member, adapted for urging the second wiping member toward the lubrication ring; [and] wherein the fixed stem seal member is polytetrafluoroethylene;

wherein at least one of the first and second wiping members has on at least one side a radially centrally located, axially extended area and a radially outwardly located area having a smaller axial dimension than the axially extended area: and wherein at least one of the radially centrally located area and the radially outwardly located area has a surface substantially perpendicular to an axis of the stem.

32. A method for assembling a high/low-temperature valve stem sealing system, comprising the steps of:

a) providing a bonnet having a central axis therein about a cylindrical bore, said bonnet having distal and proximal ends, wherein said distal end is partially closed by a radially inward extending bottom lip;

b) providing a valve stem along the central axis in the bore;

c) installing a fixed stem seal member in the bore circumjacent the stem and adjacent the bottom lip;

d) installing a loading spring member within the bore circumjacent the stem and against the fixed stem seal;

e) installing a first wiping member in the bore circumjacent the stem and against the spring member;

f) installing a lubrication ring in the bore circumjacent the stem and against the first wiping member;

g) installing a second wiping member against the lubrication ring in the bore circumjacent the stem and axially displaced from the first wiping member;

h) compressing the spring member between the fixed steam seal member and wiping member, via the lubrication ring and the second wiping member with a removable top cover having a central aperture circumjacent the stem and adapted for at least partially enclosing said proximal end of the bonnet;

i) securing the fixed stem seal, the spring member, the first wiping member, the lubrication ring, and the second wiping member in the central bore with the removable top cover; and j) disposing a lubricant between the first wiping member and the lubrication ring;

k) wherein the lubrication ring is a porous material and is toroidal in shape, having on at least one side a radially centrally located, axially depressed area and a radially outwardly located area having a larger axial dimension than the radially centrally located areas wherein at least one of the radially centrally located area and the radially outwardly located area has a surface substantially perpendicular to an axis of the stem.

33. A method for assembling a high/low-temperature valve stem sealing system, comprising the steps of:

a) providing a bonnet having a central axis therein about a cylindrical bore, said bonnet having distal and proximal ends, wherein said distal end is partially closed by a radially inward extending bottom lip;

b) providing a valve stem along the central axis in the bore;

c) installing a fixed stem seal member in the bore circumjacent the stem and adjacent the bottom lip;

d) installing a loading spring member within the bore circumjacent the stem and against the fixed stem seal;

e) installing a first wiping member in the bore circumjacent the stem and against the spring member;

f) installing a lubrication ring in the bore circumjacent the stem and against the first wiping member;

g) installing a second wiping member against the lubrication ring in the bore circumjacent the stem and axially displaced from the first wiping member;

h) compressing the spring member between the fixed steam seal member and wiping member, via the lubrication ring and the second wiping member with a removable top cover having a central aperture circumjacent the stem and adapted for at least partially enclosing said proximal end of the bonnet;

i) securing the fixed stem seal, the spring member, the first wiping member, the lubrication ring, and the second wiping member in the central bore with the removable top cover; and j) disposing a lubricant between the second wiping member and the lubrication ring;

k) wherein the lubrication ring is a porous material and is toroidal in shape having on at least one side a radially centrally located, axially depressed area and a radially outwardly located area having a larger axial dimension than the radially centrally located area, wherein at least one of the radially centrally located area and the radially outwardly located area has a surface substantially perpendicular to an axis of the stem.

34. A method for assembling a high/low-temperature valve stem sealing system, comprising the steps of:

a) providing a bonnet having a central axis therein about a cylindrical bore, said bonnet having distal and proximal ends, wherein said distal end is partially closed by a radially inward extending bottom lip;

b) providing a valve stem along the central axis in the bore;

c) installing a fixed stem seal member in the bore circumjacent the stem and adjacent the bottom lip;

d) installing a loading spring member within the bore circumjacent the stem and against the fixed stem seal;

e) installing a first wiping member in the bore circumjacent the stem and against the spring member;

f) installing a lubrication ring in the bore circumjacent the stem and against the first wiping member;

g) installing a second wiping member against the lubrication ring in the bore circumjacent the stem and axially displaced from the first wiping member;

h) compressing the spring member between the fixed steam seal member and wiping member, via the lubrication ring and the second wiping member with a removable top cover having a central aperture circumjacent the stem and adapted for at least partially enclosing said proximal end of the bonnet;

i) securing the fixed stem seal, the spring member, the first wiping member, the lubrication ring, and the second wiping member in the central bore with the removable top cover; and j) filling the lubrication ring with a lubricant before installation in step f);

k) wherein the lubrication ring is a porous material and is toroidal in shape, having on at least one side a radially centrally located, axially depressed area and a radially outwardly located area having a larger axial dimension than the radially centrally located area, wherein at least one of the radially centrally located area and the radially outwardly located area has a surface substantially perpendicular to an axis of the stem.

* * * * *